(12) United States Patent
Kodo

(10) Patent No.: US 11,019,223 B2
(45) Date of Patent: May 25, 2021

(54) IMAGE FORMING APPARATUS AND POSITION CORRECTING METHOD

(71) Applicant: TOSHIBA TEC KABUSHIKI KAISHA, Tokyo (JP)

(72) Inventor: Masahiro Kodo, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/743,499

(22) Filed: Jan. 15, 2020

(65) Prior Publication Data

US 2020/0153976 A1 May 14, 2020

Related U.S. Application Data

(63) Continuation of application No. 16/109,584, filed on Aug. 22, 2018, now Pat. No. 10,574,834.

(30) Foreign Application Priority Data

Jan. 5, 2018 (JP) .............................. JP2018-000835

(51) Int. Cl.
*H04N 1/00* (2006.01)
*G03G 15/00* (2006.01)
*G03G 15/01* (2006.01)

(52) U.S. Cl.
CPC ..... *H04N 1/00018* (2013.01); *G03G 15/0131* (2013.01); *G03G 15/5062* (2013.01);
(Continued)

(58) Field of Classification Search
CPC ........... G03G 15/0131; G03G 15/5062; G03G 2215/0161; H04N 1/00018;
(Continued)

(56) References Cited

U.S. PATENT DOCUMENTS 6,328,395 B1 * 12/2001 Kitahara .............. B41J 2/04541
347/15
6,693,752 B2 2/2004 Azumai
(Continued)

FOREIGN PATENT DOCUMENTS

| JP | H0990697 A | 4/1997 |
|----|------------|--------|
| JP | 2014206647 A | 10/2014 |
| JP | 2017213841 A | 12/2017 |

OTHER PUBLICATIONS

Extended European Search Report dated May 8, 2019, mailed in counterpart European Application No. 18214169.7, 8 pages.

*Primary Examiner* — Negussie Worku
(74) *Attorney, Agent, or Firm* — Kim & Stewart LLP

(57) ABSTRACT

An image forming apparatus of an embodiment comprises a printer unit to print a sheet with a plurality of single colors and generate a correction sheet including a plurality of single color regions at different positions between a first reference region and a second reference region. The first and second reference regions are a reference color. An image reading unit is configured to read the correction sheet. A processor is configured to calculate a shift amount in a main scanning direction of the printer unit for each single color region based on RGB luminance values obtained from the correction sheet by the image reading unit and to correct a printer scan position along the main scanning direction for each single color in the plurality of single colors corresponding to the single color regions using calculated shift amounts.

17 Claims, 16 Drawing Sheets

(52) U.S. Cl.
CPC ..... *H04N 1/00023* (2013.01); *H04N 1/00045* (2013.01); *H04N 1/00063* (2013.01); *H04N 1/00068* (2013.01); *H04N 1/00082* (2013.01); *G03G 2215/0161* (2013.01)

(58) Field of Classification Search
CPC .......... H04N 1/00023; H04N 1/00045; H04N 1/00063; H04N 1/00068; H04N 1/00082
USPC ...................................................... 358/504
See application file for complete search history.

(56) References Cited

U.S. PATENT DOCUMENTS

| | | | |
|---|---|---|---|
| 7,376,375 B2 | 5/2008 | Kobayashi et al. | |
| 8,452,209 B2 | 5/2013 | Tomita et al. | |
| 8,506,037 B2* | 8/2013 | Harada | H04N 1/506 347/19 |
| 8,786,898 B2 | 7/2014 | Katayama | |
| 8,811,865 B2* | 8/2014 | Inoue | G03G 15/0178 399/301 |
| 9,221,268 B1* | 12/2015 | Mochizuki | B41J 2/2135 |
| 10,101,205 B2 | 10/2018 | Kasahara et al. | |
| 10,574,834 B2* | 2/2020 | Kodo | H04N 1/00018 |
| 2003/0234827 A1* | 12/2003 | Tsuruoka | B41J 19/202 347/14 |
| 2006/0165442 A1 | 7/2006 | Kobayashi et al. | |
| 2007/0220422 A1* | 9/2007 | Cook | H04N 1/128 715/210 |
| 2008/0292335 A1 | 11/2008 | Kubota et al. | |
| 2013/0038885 A1* | 2/2013 | Higashiyama | H04N 1/506 358/1.9 |
| 2013/0100225 A1* | 4/2013 | Kodo | G03G 21/1666 347/224 |
| 2014/0072351 A1 | 3/2014 | Nishina et al. | |
| 2014/0313250 A1* | 10/2014 | Teraji | B41J 25/003 347/9 |
| 2016/0162762 A1* | 6/2016 | Maeda | G06K 15/027 358/1.18 |
| 2016/0191748 A1* | 6/2016 | Hirose | H04N 1/506 358/518 |
| 2017/0038702 A1* | 2/2017 | Kodo | G03G 15/0409 |
| 2017/0057266 A1* | 3/2017 | Kimura | H04N 1/00039 |
| 2017/0134623 A1 | 5/2017 | Lee | |
| 2017/0237878 A1 | 8/2017 | Matsumi | |
| 2018/0011437 A1 | 1/2018 | Ikeda | |
| 2018/0173478 A1 | 6/2018 | Hayakawa | |
| 2019/0129341 A1* | 5/2019 | Esumi | G03G 15/04045 |
| 2019/0132454 A1 | 5/2019 | Fukase | |
| 2019/0132485 A1 | 5/2019 | Koga et al. | |
| 2019/0137414 A1 | 5/2019 | Nomura | |
| 2019/0196354 A1 | 6/2019 | Hotogi | |
| 2020/0021708 A1* | 1/2020 | Kojima | G03G 15/043 |

* cited by examiner

FIG. 2
SHEET CARRYING DIRECTION
~50
51 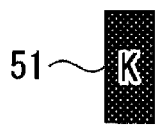
52 
53 
54 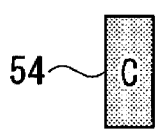
55 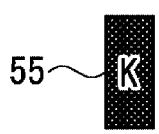

FIG. 10

| COORDINATE | R | G | B |
|---|---|---|---|
| 1732 | 228 | 233 | 235 |
| 1733 | 226 | 231 | 230 |
| 1734 | 225 | 230 | 231 |
| 1735 | 228 | 229 | 235 |
| 1736 | 223 | 228 | 229 |
| 1737 | 223 | 229 | 235 |
| 1738 | 222 | 225 | 229 |
| 1739 | 217 | 218 | 224 |
| 1740 | 205 | 185 | 195 |
| 1741 | 175 | 96 | 113 |
| 1742 | 169 | 77 | 96 |
| 1743 | 164 | 77 | 89 |
| 1744 | 167 | 76 | 92 |
| 1745 | 164 | 73 | 94 |
| 1746 | 168 | 76 | 95 |
| 1747 | 166 | 77 | 91 |
| 1748 | 165 | 72 | 93 |
| 1749 | 163 | 69 | 85 |
| 1750 | 166 | 71 | 90 |
| 1751 | 176 | 99 | 114 |
| 1752 | 212 | 191 | 200 |
| 1753 | 221 | 221 | 228 |
| 1754 | 224 | 228 | 233 |
| 1755 | 225 | 231 | 234 |
| 1756 | 227 | 233 | 234 |
| 1757 | 226 | 231 | 237 |
| 1758 | 228 | 237 | 238 |
| 1759 | 227 | 236 | 236 |
| 1760 | 227 | 232 | 234 |
| 1761 | 230 | 236 | 236 |

FIG. 11

| R | G | B |
|---|---|---|
| 2 | 4 | 3 |
| 4 | 6 | 8 |
| 5 | 7 | 7 |
| 2 | 8 | 3 |
| 7 | 9 | 9 |
| 7 | 8 | 3 |
| 8 | 12 | 9 |
| 13 | 19 | 14 |
| 25 | 52 | 43 |
| 55 | 141 | 125 |
| 61 | 160 | 142 |
| 66 | 160 | 149 |
| 63 | 161 | 146 |
| 66 | 164 | 144 |
| 62 | 161 | 143 |
| 64 | 160 | 147 |
| 65 | 165 | 145 |
| 67 | 168 | 153 |
| 64 | 166 | 148 |
| 54 | 138 | 124 |
| 18 | 46 | 38 |
| 9 | 16 | 10 |
| 6 | 9 | 5 |
| 5 | 6 | 4 |
| 3 | 4 | 4 |
| 4 | 6 | 1 |
| 2 | 0 | 0 |
| 3 | 1 | 2 |
| 3 | 5 | 4 |
| 0 | 1 | 2 |

FIG. 13

| R | G | B |
|---|---|---|
| 3464 | 6928 | 5196 |
| 6932 | 10398 | 13864 |
| 8670 | 12138 | 12138 |
| 3470 | 13880 | 5205 |
| 12152 | 15624 | 15624 |
| 12159 | 13896 | 5211 |
| 13904 | 20856 | 15642 |
| 22607 | 33041 | 24346 |
| 43500 | 90480 | 74820 |
| 95755 | 245481 | 217625 |
| 106262 | 278720 | 247364 |
| 115038 | 278880 | 259707 |
| 109872 | 280784 | 254624 |
| 115170 | 286180 | 251280 |
| 108252 | 281106 | 249678 |
| 111808 | 279520 | 256809 |
| 113620 | 288420 | 253460 |
| 117183 | 293832 | 267597 |
| 112000 | 290500 | 259000 |
| 94554 | 241638 | 217124 |
| 31536 | 80592 | 66576 |
| 15777 | 28048 | 17530 |
| 10524 | 15786 | 8770 |
| 8775 | 10530 | 7020 |
| 5268 | 7024 | 7024 |
| 7028 | 10542 | 1757 |
| 3516 | 0 | 0 |
| 5277 | 1759 | 3518 |
| 5280 | 8800 | 7040 |
| 0 | 1761 | 3522 |

IMAGE FORMING APPARATUS AND POSITION CORRECTING METHOD

CROSS-REFERENCE TO RELATED APPLICATIONS

This application is a continuation of U.S. patent application Ser. No. 16/109,584, filed on Aug. 22, 2018, which is based upon and claims the benefit of priority from Japanese Patent Application No. 2018-000835, filed Jan. 5, 2018, the entire contents of each of which are incorporated herein by reference.

FIELD

Embodiments described herein relate to an image forming apparatus and a position correcting method.

BACKGROUND

In an image forming apparatus using a laser scanning unit (LSU) for exposure, color shifting occurs if magnification in a main scanning direction for each color is different. Therefore, in the related art, a structure is adopted in which alignment sensors are disposed at three places including near the center position along the main scanning direction. However, such a structure sometimes increases constraints of component disposition and costs.

DESCRIPTION OF THE DRAWINGS

FIG. 2 is a view showing an example of a correction sheet.
FIG. 10 shows a table of RGB values according coordinate position.
FIG. 11 shows a difference value table.
FIG. 13 shows a multiplication result table.

DETAILED DESCRIPTION

According to one embodiment, an image forming apparatus includes a printer unit configured to print a sheet with a plurality of single colors and to generate a correction sheet including a plurality of single color regions at different positions along a travel direction of the correction sheet in the printer unit. The plurality of single color regions being between a first reference region and a second reference region in the travel direction. The first and second reference regions being a reference color. An image reading unit, such as, for example, a document scanner, is configured to read the correction sheet. A processor is configured to calculate a shift amount in a main scanning direction of the printer unit for each single color region based on RGB luminance values of the single color region as obtained from the correction sheet using the image reading unit and to correct a printer scan position along the main scanning direction for each single color in the plurality of single colors corresponding to the single color regions using calculated shift amounts.

Hereinafter, an image forming apparatus and a position correcting method of an example embodiment will be described with reference to drawings.

Figure 1:
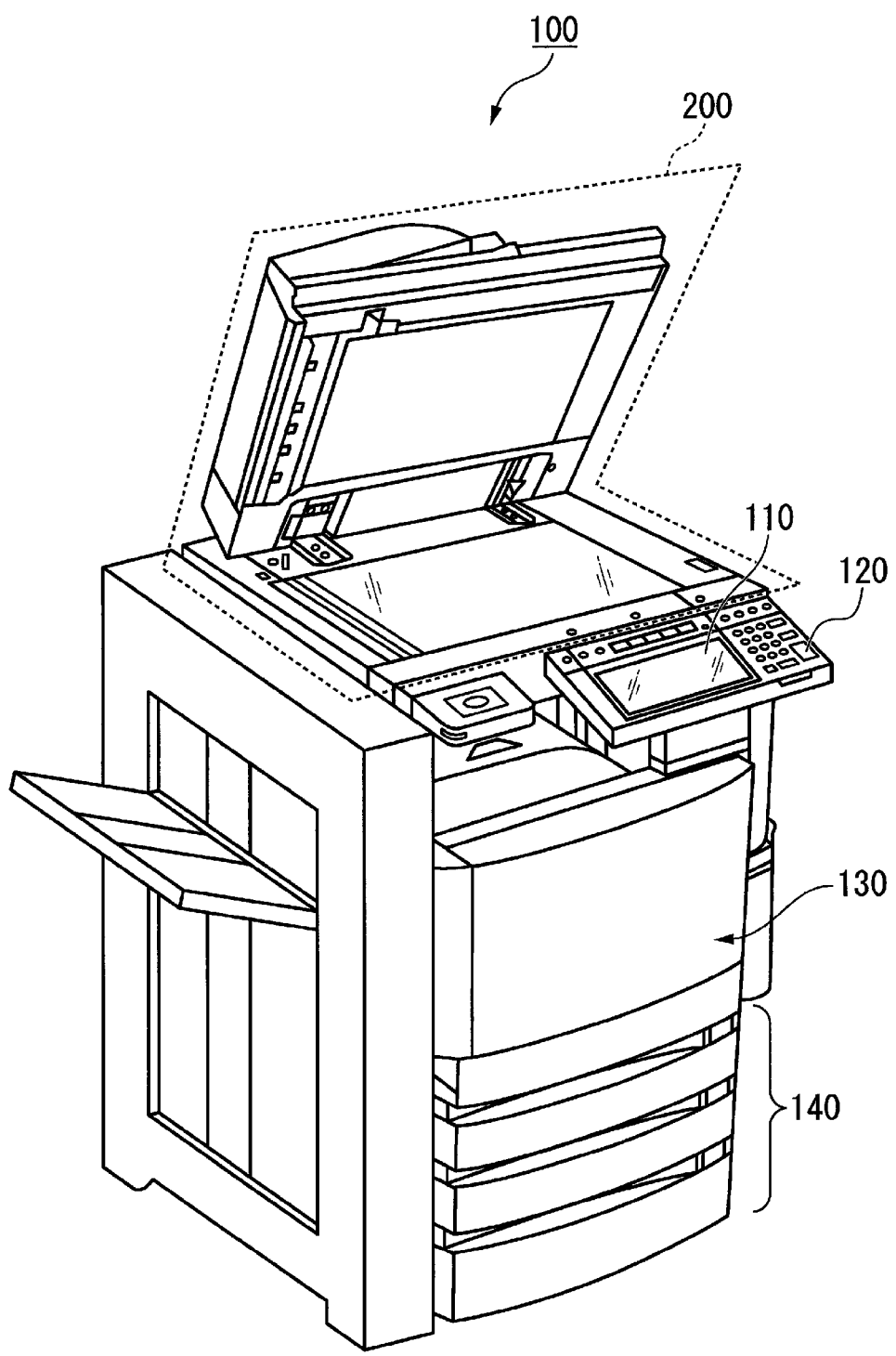
FIG. 1 is an external view of an image forming apparatus according to an embodiment.

FIG. 1 is an external view showing an overall configuration example of an image forming apparatus 100 according to the embodiment.

The image forming apparatus 100 of the embodiment is a multifunctional peripheral (MFP also referred to as a Multi-Function Peripheral) capable of forming a toner image on a sheet. The sheet is, for example, a document, or a paper on which characters, images, and the like have been formed or are to be formed. The sheet may be anything that may be read or scanned by the image forming apparatus 100. The image forming apparatus 100 reads an image on the sheet, then generates digital data corresponding to the read image and/or an image file storing the digital data.

The image forming apparatus 100 includes a display 110, a control panel 120, a printer unit 130, a sheet storage unit 140, and an image reading unit 200. The printer unit 130 is a device for forming and fixing a toner image to a sheet.

The display 110 is an image display apparatus such as a liquid crystal display or an organic electroluminescence (EL) display. The display 110 displays various information of the image forming apparatus 100. In addition, the display 110 outputs a signal corresponding to the input operation performed by a user to a processor of the image forming apparatus 100. Further, the display 110 accepts the user's input operations.

The control panel 120 has a plurality of buttons. The control panel 120 receives the user's input operations. The control panel 120 outputs a signal corresponding to an input operation performed by the user. The display 110 and the control panel 120 may be configured as an integrated touch panel.

The printer unit 130 executes image forming processing. In the image forming processing, the printer unit 130 forms an image on a sheet based on the image information generated by the image reading unit 200 or received via a communication path. The printer unit 130 forms an image on a sheet using different color toners (e.g., yellow color, magenta color, cyan color, and black color). The possible image formation instructions include, for example, an instruction to forma normal image (e.g., print an image according to supplied image information) or an instruction to forma correction image (e.g., print a test sheet or the like).

The normal image formation instruction is an instruction for printing an image on a sheet based on the image information generated by the image reading unit 200 or the like. The instruction to form a correction image is an instruction for printing an image to be used for correcting the position or other aspects of the image on the sheet. When receiving an instruction to form a correction image, the printer unit 130 performs the following processing, for example: the printer unit 130 forms an image in which a monochrome color patches are interposed between reference colors, the monochrome patches being positioned in the vicinity of the center of the sheet along the main scanning direction. The monochrome color patches thus formed can be referred to as a correction image. The sheet on which an image (i.e., the correction image) in which a plurality of monochrome color patches is arranged can be referred to as a correction sheet.

FIG. 2 is a view showing an example of a correction sheet. As shown in FIG. 2, an image including color patches 51 to 55 is formed as a correction image on a correction sheet 50. The color patch 51 is a black (K) color patch. The color patch 52 is a magenta (M) color patch. The color patch 53 is a yellow (Y) color patch. The color patch 54 is a cyan (C) color patch. The color patch 55 is a black (K) color patch. The correction image formed on the correction sheet 50 is not limited to the particular order shown in FIG. 2. On the correction sheet 50, an image in monochrome color patches are formed between reference color patches are arranged in order along a sheet carrying direction. In the example shown in FIG. 2, the reference color is black (K) color and the monochrome color patches interposed between the reference color patches are single color M, Y, C patches.

Returning to FIG. 1, the printer unit 130 has a structure in which alignment sensors are disposed in at least two places offset from the center position along the main scanning direction and there is no alignment sensor provided at the center along the main scanning direction. The two positions of the alignment sensors are, for example, front and rear positions. The sheet storage unit 140 accommodates a sheet to be used for image formation in the printer unit 130.

The image reading unit 200 reads images on documents or otherwise as differences in light and shade of reflected (or otherwise) light. For example, the image reading unit 200 reads an image printed on an original document. The image reading unit 200 reads images with a scanner having a resolution of 300 dots per inch (dpi), for example. The image reading unit 200 records the image data as-read by the scanner. The recorded image data may be transmitted to another information processing device via a network. The recorded image data may also be printed on a sheet by the printer unit 130.

Figure 3:
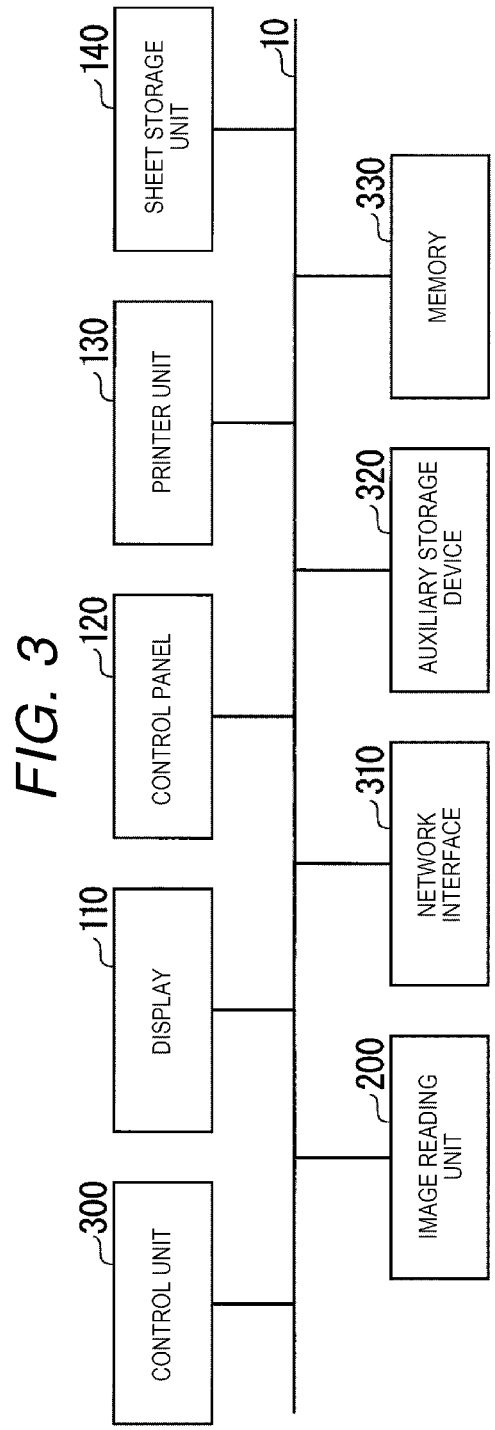
FIG. 3 is a block view showing a hardware configuration of an image forming apparatus.

FIG. 3 is a block view showing a hardware configuration of the image forming apparatus 100. As shown in FIG. 3, the image forming apparatus 100 includes a display 110, a control panel 120, a printer unit 130, a sheet storage unit 140, an image reading unit 200, a control unit 300, a network interface 310, an auxiliary storage device 320, and a memory 330. The display 110, the control panel 120, the printer unit 130, the sheet storage unit 140, and the image reading unit 200 have been described above. The control unit 300, the network interface 310, the auxiliary storage device 320, and the memory 330 will be further described. Each unit is connected so as to enable data communication via a system bus 10.

The control unit 300 is, for example, a processor such as a central processing unit (CPU). The control unit 300 controls the operation of each functional unit of the image forming apparatus 100. The control unit 300 executes various kinds of processing by executing software programs and the like. When receiving an instruction to execute printing, the control unit 300 sends a printing execution instruction to the printer unit 130. In addition, when receiving an instruction to read a sheet, the control unit 300 causes the image reading unit 200 to execute a sheet reading.

The network interface 310 exchanges data with other devices across a network. Here, the other device is an information processing device, such as a personal computer, for example. The network interface 310 operates as an input interface and receives data or instructions transmitted from other devices. An instruction transmitted from another device can be an instruction to execute printing, or the like. In addition, the network interface 310 operates as an output interface and transmits data to other devices.

The auxiliary storage device 320 is, for example, a hard disk or a solid-state drive (SSD) and stores various data. In this context, various data includes, for example, an image clock modulation setting table, digital data, a print job, a job log, and the like. The image clock modulation setting table is a table used for modulating an image clock. In this context, the image clock is an image data oscillation clock for causing a laser diode (LD) included in the printer unit 130 to emit light beam at a predetermined timing. The reference image clock is established by reference to the two points (positions) of alignment sensor. In the image clock modulation setting table, the modulation amount (or information corresponding thereto) for the image clock is registered. The digital data is the image data generated by the image reading unit 200.

The memory 330 is, for example, a random access memory (RAM). The memory 330 temporarily stores data used by a functional unit of the image forming apparatus 100. The memory 330 may store the digital data generated by the image reading unit 200. The memory 330 may temporarily store any or all of the image clock modulation setting table, the digital data, the print job, and the job log.

Figure 4:
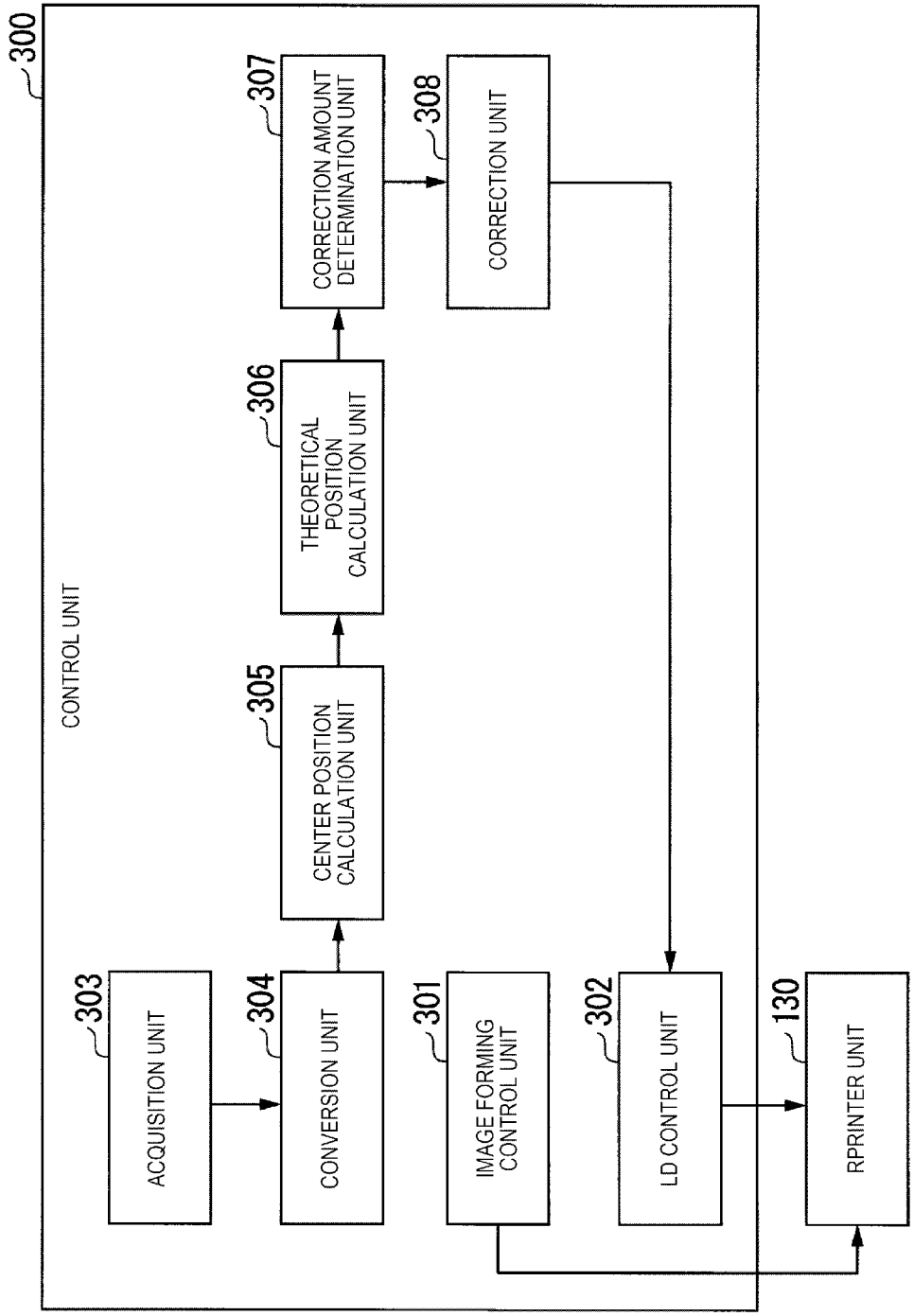
FIG. 4 is a schematic block view of a control unit.

FIG. 4 is a schematic block view showing aspects of the control unit 300. The control unit 300 includes an image forming control unit 301, an LD control unit 302, an acquisition unit 303, a conversion unit 304, a center position calculation unit 305, a theoretical position calculation unit 306, a correction amount determination unit 307, and a correction unit 308. The acquisition unit 303, the conversion unit 304, the center position calculation unit 305, the theoretical position calculation unit 306, the correction amount determination unit 307, and the correction unit 308 can be collectively referred to as an image position correcting unit.

The image forming control unit 301 controls the image forming processing by the printer unit 130. For example, when receiving an instruction to form a normal image, the image forming control unit 301 controls the printer unit 130 to print an ordinary image. Further, when receiving an instruction to form a correction image, the image forming control unit 301 controls the printer unit 130 to form a correction image.

The LD control unit 302 controls the laser diode in the printer unit 130. For example, the LD control unit 302 controls the image clock used for generation of the laser light produced by the LD. More specifically, the LD control unit 302 adjusts the positioning of the image in the main scanning direction by adjusting the image clock by the modulation amount in the image clock modulation setting table. In this manner, the LD control unit 302 may arbitrarily modulate the image clock for each color to adjust image position in the main scanning direction. In addition, the LD control unit 302 adjusts the image positions so that the positions of the four YMCK colors match with the positioning of the two alignment sensors.

The acquisition unit 303 acquires the image data read by the image reading unit 200 from the auxiliary storage device 320. The acquisition unit 303 can also acquire the image data of the correction sheet from the auxiliary storage device 320.

The conversion unit 304 converts the YMCK monochrome color patches being formed on the correction sheet into RGB. The conversion unit 304 converts the YMCK monochrome color patches into RGB for several coordinate positions along the main scanning direction.

The center position calculation unit 305 performs a predetermined calculation based on the values of the coordinate position along the main scanning direction and the values of R, G, and B at each coordinate position. The center position calculation unit 305 first acquires the maximum values of R, G, and B in the values of R, G, and B recorded for each coordinate position along the main scanning direction. Next, the center position calculation unit 305 calculates the difference between maximum values of R, G, and B and the values of R, G, and B for each coordinate position. In addition, the center position calculation unit 305 calculates the sum of the difference values at each coordinate position for each of R, G, and B. Further, the center position calculation unit 305 calculates the product (multiplication operation) of the values at the coordinate positions of RGB with the difference values for R, G, and B at each coordinate position. The center position calculation unit 305 then calculates the sum of the product values of respective RGB and calculates the center position of a color patch by dividing the sum of the respective products by the sum of the difference values for R, G, and B.

The theoretical position calculation unit 306 calculates a theoretical position based on a value obtained by dividing the sum of the respective products calculated by the center position calculation unit 305 by the sum of the respective difference values for R, G, and B. Here, the theoretical position for the center position of the color patch is the position as derived by calculation. That is, the theoretical position is not necessarily the center position of the color patch as actually formed on the sheet. Next, the theoretical position calculation unit 306 calculates an inclination of the sheet using the center positions for the two reference color patches to calculate a theoretical position for another color by taking the inclination of the sheet thus calculated into account.

The correction amount determination unit 307 determines a shift amount between the theoretical position and the determined center position for each color patch with the reference color and determines a correction amount for use in the vicinity of the center along the main scanning direction with the shift amount. The correction unit 308 selects a modulation setting table according to the determined correction amount and corrects the image position.

Figure 5:
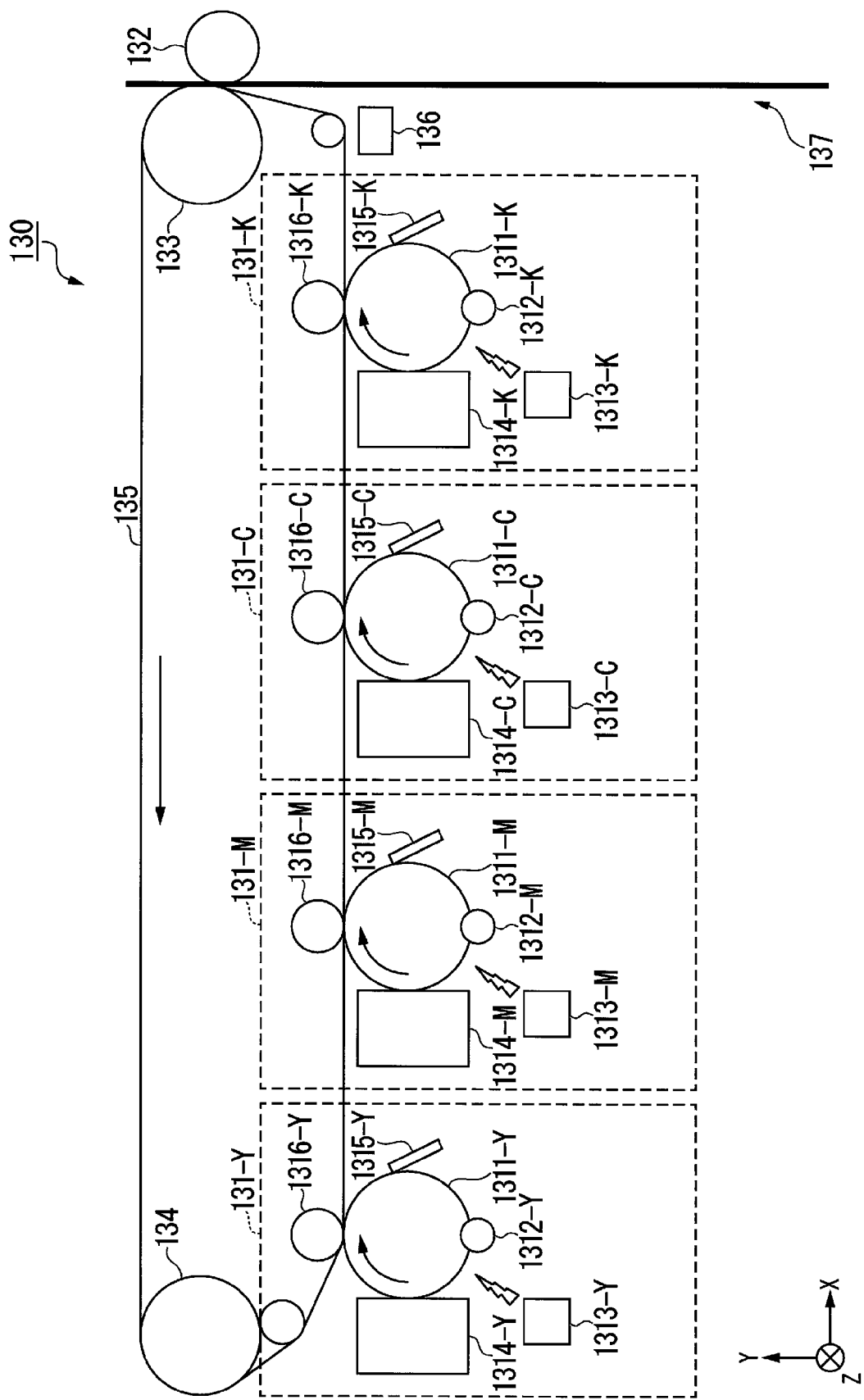
FIG. 5 is a view showing aspects of an example configuration of a printer unit.
Figure 6:
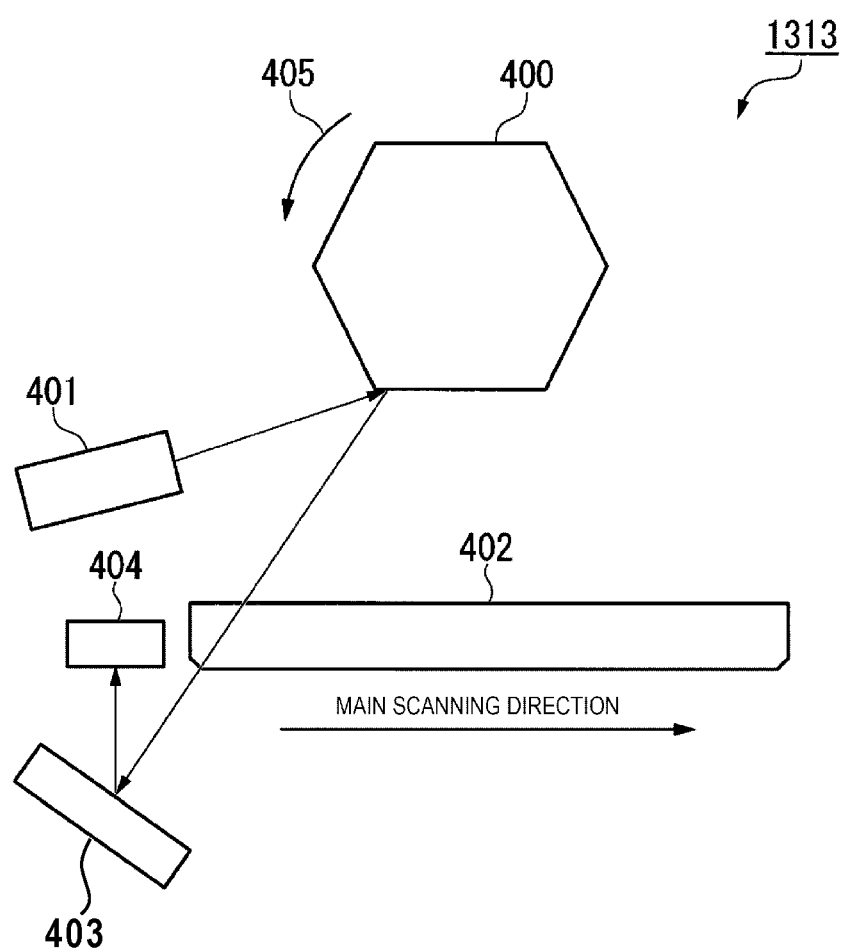
FIG. 6 is a view showing additional aspects of an example configuration of a printer unit.

Next, aspects of the printer unit 130 will be described with reference to FIGS. 5 and 6. FIG. 5 is a view showing a specific configuration of an image forming unit in the printer unit 130. FIG. 6 is a diagram showing a specific configuration of an exposure device in the printer unit 130.

As shown in FIG. 5, the printer unit 130 includes process units 131 (131-Y, 131-M, 131-C, 131-K) for each printer color, a secondary transfer roller 132, a secondary transfer opposing roller 133, a tension roller 134, and a transfer belt 135. In FIG. 5, the process units 131 corresponding to the respective colors of yellow, magenta, cyan, and black are distinguished by the designation Y, M, C, and K, respectively. For example, the process unit 131-Y represents the process unit 131 for yellow.

Each process unit 131 forms a toner image corresponding to its respective color (YMCK) on the transfer belt 135, which is an endless belt. Each process unit 131 respectively includes a photoconductive drum 1311 (-Y, -M, -C, -K), a charger 1312 (-Y, -M, -C, -K), an exposure device 1313 (-Y, -M, -C, -K), a developing device 1314 (-Y, -M, -C, -K), a photoconductive cleaner 1315 (-Y, -M, -C, -K), and a primary transfer roller 1316 (-Y, -M, -C, -K. As noted, in FIG. 5, the units corresponding to the respective colors of yellow, magenta, cyan, and black are designated with Y, M, C, and K, respectively. For example, 1311-M represents the photoconductive drum 1311 in the process unit 131-M (magenta).

In each process unit 131, an electrostatic latent image is generated on the surface of the photoconductive drum 1311. The photoconductive drum 1311 is an image carrier, for example, a cylindrical drum. The photoconductive drum 1311 has a photoreceptor substance on the outer surface thereof and has a property of releasing (discharging) a static electrical charge at the portions of the surface that are irradiated with light. The charger 1312 charges the surface of the photoconductive drum 1311 with static electricity. The charger 1312 is, for example, a needle electrode. The exposure device 1313 forms an electrostatic latent image on the surface of the photoconductive drum 1311 corresponding to the image to be printed. The exposure device 1313 is, for example, a laser irradiation device. The developing device 1314 supplies toner to the surface of the photoconductive drum 1311 and develops the electrostatic latent image with the toner. The photoconductive cleaner 1315 removes the residual toner from the photoconductive drum 1311. The primary transfer roller 1316 transfers the developed electrostatic latent image from the surface of the photoconductive drum 1311 to the transfer belt 135.

The secondary transfer roller 132 transfers the toner image from the transfer belt 135 to a sheet. The secondary transfer opposing roller 133 is disposed at a position facing the secondary transfer roller 132 with the transfer belt 135 interposed therebetween. The sheet is carried along a carrying path 137 and interposed between the secondary transfer opposing roller 133 and the secondary transfer roller 132. The tension roller 134 is a roller for imparting tension to the transfer belt 135. The two alignment sensors 136 are installed inside a pre-secondary transfer guide below the transfer belt 135. For example, an alignment sensor 136 is placed at two positions on either side of the carrying path 137 in the sheet width direction (Z-direction in FIG. 5). That is, in this embodiment, the alignment sensor 136 is not disposed in the vicinity of center along the sheet width direction (Z-direction in FIG. 5). At least one of the alignment sensors 136 can have duals functions as an alignment sensor and a toner adhesion amount sensor, for example.

As shown in FIG. 6, the printer unit 130 includes a polygon mirror 400, a laser diode (LD) 401, an fθ lens 402, a mirror 403, and a beam detect (BD) sensor 404. The polygon mirror 400, the LD 401, the fθ lens 402, the mirror 403, and the BD sensor 404 are configured as an exposure device.

The polygon mirror 400 is a mirror having a plurality of reflecting surfaces (facets). In the present embodiment, a case in which the polygon mirror 400 has six reflective surfaces will be described as an example, but, in general, the polygon mirror 400 may have any number of surfaces so long as a plurality of reflective surfaces are provided. The number of surfaces on the polygon mirror 400 may be determined by various parameters such as intended print speed, resolution, and the like. For example, the polygon mirror 400 rotates in the direction of an arrow 405 (counterclockwise) by the driving of a motor.

The LD 401 provides laser light at times according to the control of the LD control unit 302. Here, the LD 401 includes a light source for each color of the printer unit 130. Specifically, the LD 401 includes a light source for Y color, a light source for M color, a light source for C color, and a light source for K color. The fθ (f-theta) lens 402 provides a constant scan rate for the laser lights reflected by the polygon mirror 400 onto a common imaging plane.

The mirror 403 reflects the laser light reflected by the polygon mirror 400 so that the laser light is reflected onto the BD sensor 404. The BD sensor 404 detects the laser light reflected by the mirror 403 as a BD signal. When detecting the laser light, the BD sensor 404 outputs a notification indicating that the laser light is being detected to the LD control unit 302. The laser light detected by the BD sensor 404 is used as a scanning start reference signal indicating a scan along the main scanning direction has started. In addition, the laser light detected by the BD sensor 404 is synchronized with a writing start position along the main scanning direction for each scan line.

Figure 7:
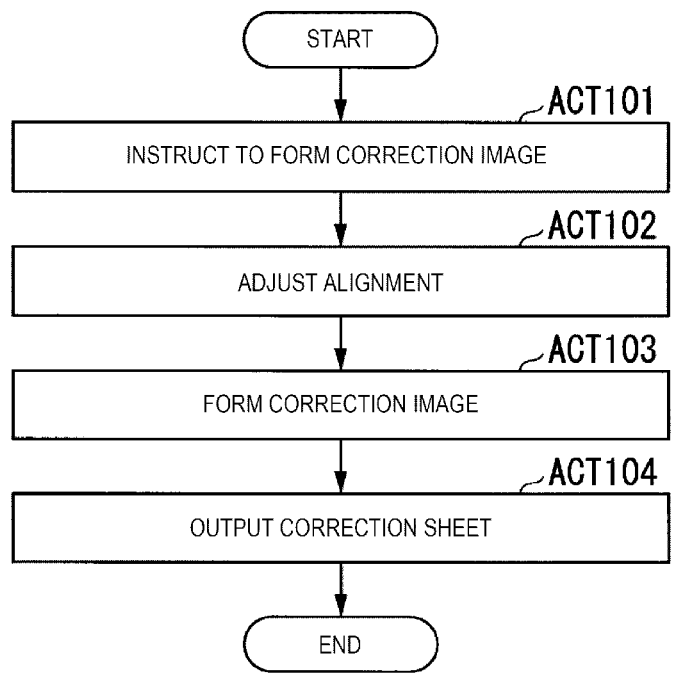
FIG. 7 is a flowchart of output processing of a correction sheet by an image forming apparatus.

FIG. 7 is a flowchart showing a flow of output sheet processing for the correction sheet by the image forming apparatus 100. When receiving an instruction to form a correction image, the control unit 300 controls the printer unit 130 to form a correction image (ACT 101). Thereafter, the control unit 300 adjusts the positions so that the positions for the four YMCK colors match each other at the positions of the two alignment sensors (ACT 102). Next, the printer unit 130 forms a correction image on a sheet from the sheet storage unit 140 (ACT 103). For example, the printer unit 130 forms the correction image shown in FIG. 2. As a result, the printer unit 130 generates a correction sheet. Thereafter, the control unit 300 controls the internal rollers and outputs the correction sheet as generated by the printer unit 130 to the outside of the apparatus (ACT 104).

Figure 8:
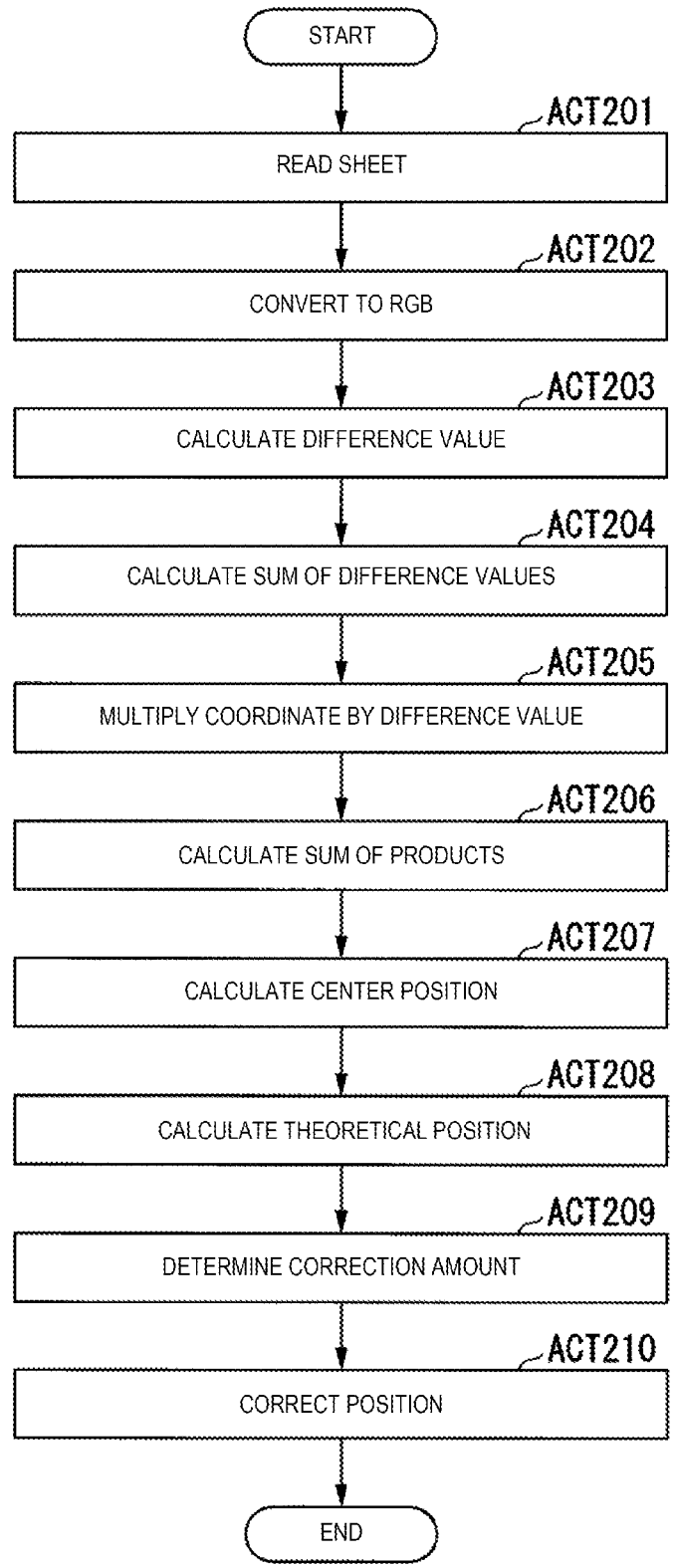
FIG. 8 is a flowchart of image position correction processing by an image forming apparatus.
Figure 9:
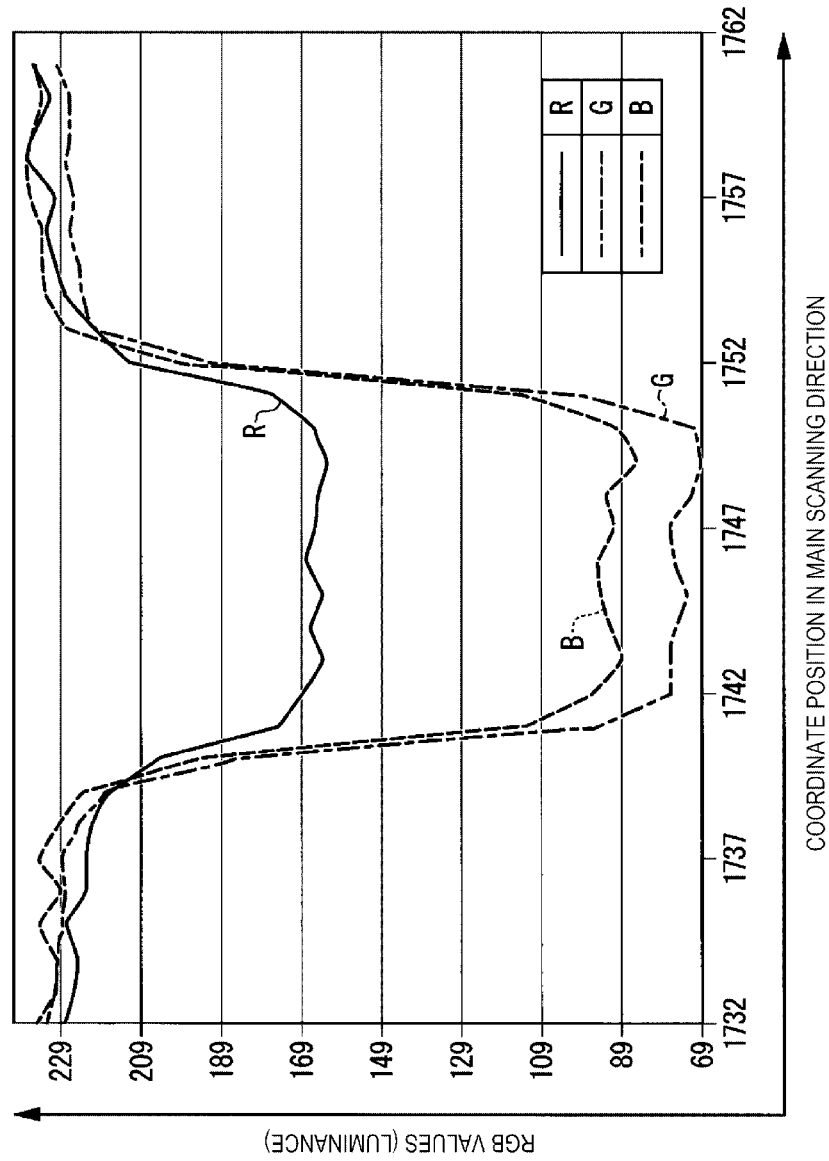
FIG. 9 shows example of converted RGB values versus position along the main scanning direction.

FIG. 8 is a flowchart showing the flow of processing for image position correction by the image forming apparatus 100. When an instruction to read a sheet is received, the control unit 300 causes the image reading unit 200 to execute sheet reading. Under the control of the control unit 300, the image reading unit 200 reads the image that has been printed on a sheet (ACT 201). The image reading unit 200 stores the as-read image data in the auxiliary storage device 320. The acquisition unit 303 acquires the image data of the sheet as-read by the image reading unit 200 from the auxiliary storage device 320. The conversion unit 304 converts the individual YMCK color patches formed on the correction sheet into RGB values (ACT 202). FIG. 9 is a view showing an example of values after conversion to RGB. FIG. 9 shows RGB values after the conversion unit 304 has converted the magenta (M) color patch into RGB values. That is, an M color patch within the range of the coordinate positions along the main scanning direction shown in FIG. 9. In FIG. 9, the horizontal axis represents a coordinate position along the main scanning direction, and the vertical axis represents the RGB luminance values. In the example shown in FIG. 9, the RGB values from about coordinate position 1742 to about coordinate position 1752 are lower than the RGB values at the other coordinate positions along the main scanning direction outside this range. The conversion unit 304 generates a table of values (referred to as "table after RGB conversion") in which the converted value (RGB value) is associated with the coordinate position.

FIG. 10 is a view showing an example of a table of luminance values after RGB conversion has been performed. In the table shown in FIG. 10, values of R, G, and B are registered in association with several coordinate positions along the main scanning direction. FIG. 10 shows the table after RGB conversion of the M color patch, but the conversion unit 304 also generates additional tables for all the color patches. The conversion unit 304 outputs the generated table(s) after RGB conversion to the center position calculation unit 305.

The center position calculation unit 305 first acquires the maximum values of R, G, and B from the output table after RGB conversion. In the example shown in FIG. 10, the center position calculation unit 305 acquires the luminance value of "230" (see coordinate position=1761) as the maximum value for R, "237" (see coordinate position=1758) as the maximum value of G, and "238" (see coordinate position=1758) as the maximum value of B. Next, the center position calculation unit 305 calculates a difference between each determined maximum value of R, G, and B and the value of R, G, and B at each coordinate position (ACT 203).

For example, the center position calculation unit 305 calculates the difference between the maximum value "230" for R and the value "228" for R at the coordinate position "1732". In this case, the difference is "2" (in the arbitrary luminance units used in FIG. 9). As described above, the center position calculation unit 305 calculates the difference between the maximum value of R and the value of R at each coordinate position. Similarly, the center position calculation unit 305 calculates a difference between the maximum value of G and the value of G at each coordinate position, and also the difference between the maximum value of B and the value of B at each coordinate position. The center position calculation unit 305 generates a table (hereinafter, referred to as "difference value table") using the calculated difference values.

FIG. 11 is a view showing an example of a difference value table. In the difference value table shown in FIG. 11, the difference between the maximum values of R, G, and B and the respective values of R, G, and B at each coordinated value are registered. In particular, FIG. 11 shows a difference value table for the M color patch, but the center position calculation unit 305 also generates difference value tables for every color patch on the correction sheet.

Next, the center position calculation unit 305 calculates the sum of the difference values for each of R, G, and B (ACT 204). That is, the column of R difference values, G difference values, and B difference values are summed, respectively. For the example shown in FIG. 11, the center position calculation unit 305 calculates the sum "813" for the column of difference values for R. Likewise, the center position calculation unit 305 calculates the sum "1963" for the column of difference values for G. Additionally, the center position calculation unit 305 calculates the sum "1735" for the column of difference values for B.

Figure 12:
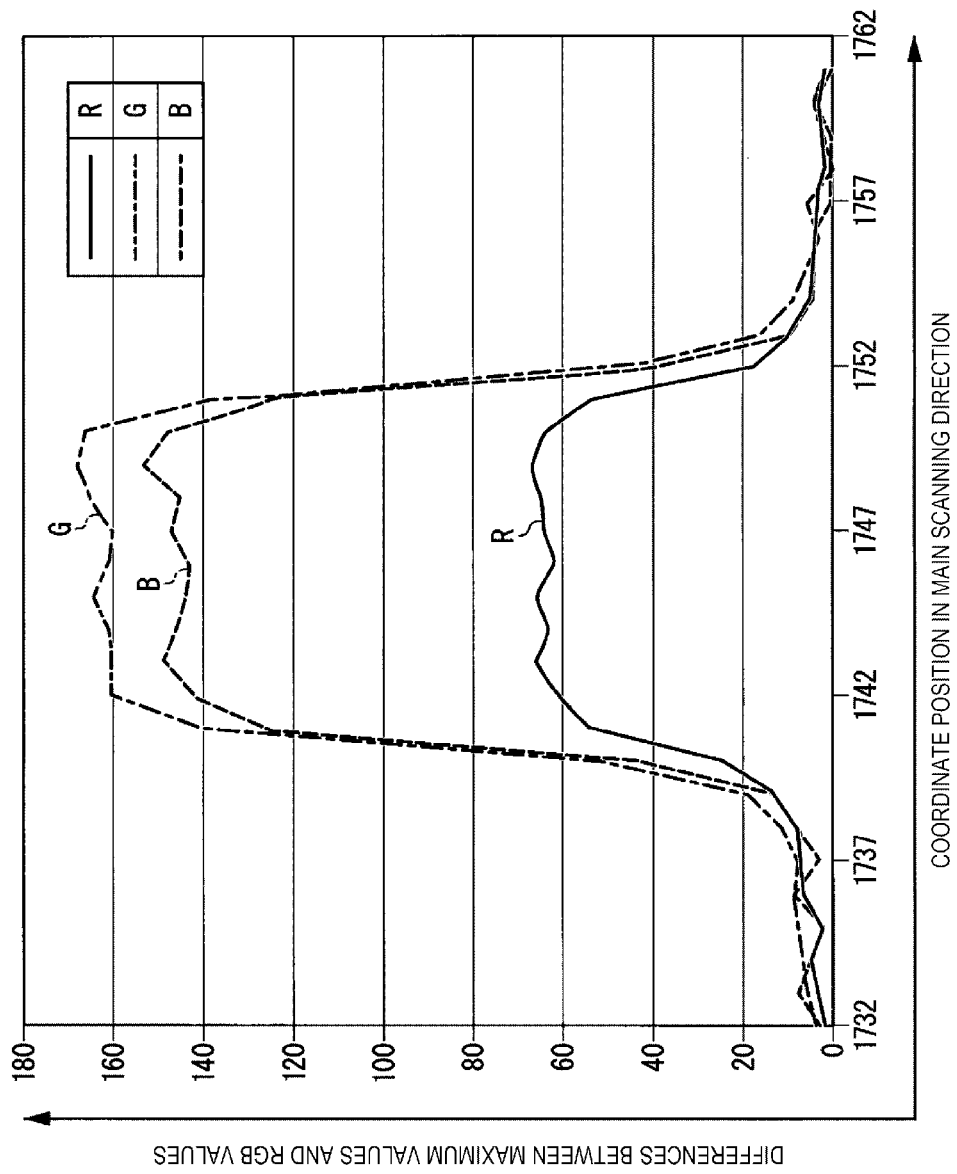
FIG. 12 is a graph depicting differences between maximum values and RGB values.

FIG. 12 is a graph plotting the differences between maximum values and RGB values according to coordinate position. In FIG. 12, the difference values for the M color patch are shown as an example. In FIG. 12, the horizontal axis represents the coordinate position along the main scanning direction, and the vertical axis represents the difference between the maximum value and the particular coordinate RGB value. In the example shown in FIG. 12, the difference values at about coordinate position "1737" to about coordinate position "1752" are higher than the difference values at the other coordinate positions outside this range along the main scanning direction.

Next, the center position calculation unit 305 multiplies the value of the coordinate position along the main scanning direction by the difference value of R, G, and B at that coordinate position as calculated in the processing of ACT 203 (ACT 205). An example of this processing will be described with reference to FIG. 11. For example, the center position calculation unit 305 multiplies the coordinate position "1732" by the difference value "2" for R at the coordinate position "1732". In this case, the multiplication result is "3464" (i.e., 1732×2=3464). As described above, the center position calculation unit 305 multiples the coordinate position and the difference value of R at that coordinate position for each coordinate position. Similarly, the center position calculation unit 305 calculates the product of the coordinate position and the difference value of G at that coordinate position for each coordinate position, and the product of the coordinate position and the difference value of B at that coordinate position for each coordinate position. Thereafter, the center position calculation unit 305 generates a table (hereinafter, referred to as "multiplication result table") including these values for the product of the coordinate position and the each difference value for R, G, and B at each coordinate position.

FIG. 13 is a diagram showing an example of a multiplication result table. In the multiplication result table shown in FIG. 13, the multiplication results for the value of the coordinate position along the main scanning direction and the respective difference values of R, G, and B at that coordinate position are registered. FIG. 13 is a multiplication result table for the M color patch, but the center position calculation unit 305 also generates multiplication result tables for all color patches.

Next, the center position calculation unit 305 calculates the sums the tabulated product values for the column of each of R, G, and B (ACT 206). For example, in the example shown in FIG. 13, the center position calculation unit 305 calculates the sum "1419353" for the R column of the multiplication result table. In addition, the center position calculation unit 305 calculates the sum "3427144" for the product values in the G column of multiplication result table. In addition, the center position calculation unit 305 calculates the sum "3029071" for the product values of B column of the multiplication result table.

Then, the center position calculation unit 305 calculates a center position of each color patch by using the sum of the difference values for each of R, G, and B and the sum of the products for each of R, G, and B (ACT 207). Specifically, the center position calculation unit 305 calculates the center position of a color patch by dividing the sum of the products for each of R, G, and B by the sum of the difference values for each of R, G, and B. An example will be described in greater detail.

For example, the center position calculation unit 305 calculates the center position=1745.822 for R by dividing the sum "1419353" of the products by the sum "813" of the difference values. In addition, the center position calculation unit 305 calculates the center position=1745.871 for G by dividing the sum "3427144" of the products by the sum "1963" of the difference values. Further, the center position calculation unit 305 calculates the center position=1745.862 for B by dividing the sum "3029071" of the products by the sum "1735" of difference values. The center position calculation unit 305 performs similar center position calculation processing for all the color patches on the correction sheet.

The theoretical position calculation unit 306 calculates a theoretical position based on the center position that was calculated by the center position calculation unit 305 (ACT 208). Specifically, first, the theoretical position calculation unit 306 calculates an inclination of the sheet output from the calculated center positions of the two reference color patches. Then, the theoretical position calculation unit 306 calculates a theoretical position of a color patch of another color by taking this inclination into account. For example, the theoretical position calculation unit 306 calculates a theoretical position of the other (non-reference) color patch by a trigonometric function.

Figure 14:
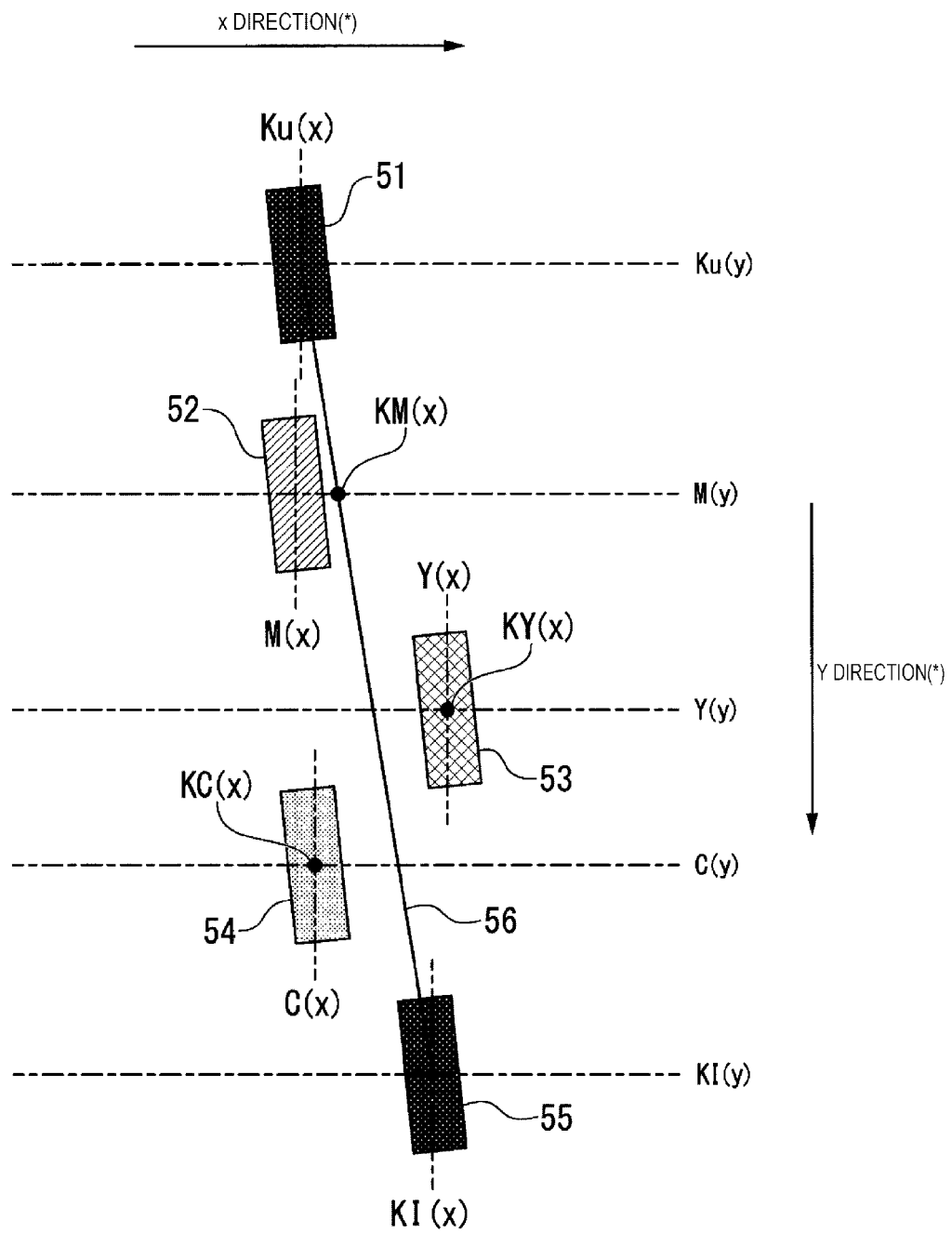
FIG. 14 depicts aspects related to calculation processing of a theoretical position.

FIG. 14 is a view for explaining aspects of the calculation processing for a theoretical position determination. In FIG. 14, the color patch 51 and the color patch 55 are color patches of the reference color (for example, K). The theoretical position calculation unit 306 calculates an inclination of the sheet based on an assumed straight line 56 connecting the center positions of the color patch 51 and the color patch 55. Here, if the shift amount of the M color patch 52 relative to reference color line is ΔM, then the expression ΔM=M(x)−KM(x) sets this value, where KM(x)=KI(x)−[(KI(y)−M(y))/(KI(y)−Ku(y))×(KI(x)−Ku(x))]. The theoretical position calculation unit 306 calculates the shift amount ΔM for the color patches of the other colors by a similar calculation. The position shifted by this calculated shift amount is considered the theoretical position.

The correction amount determination unit 307 determines a correction amount near the center in the main scanning direction based on the calculated shift amount (ACT 209). For example, the correction amount determination unit 307 sets the correction amount so that the shift will be substantially zero. The correction unit 308 selects the image clock modulation setting as necessary to correct the image position (ACT 210).

Figure 15:
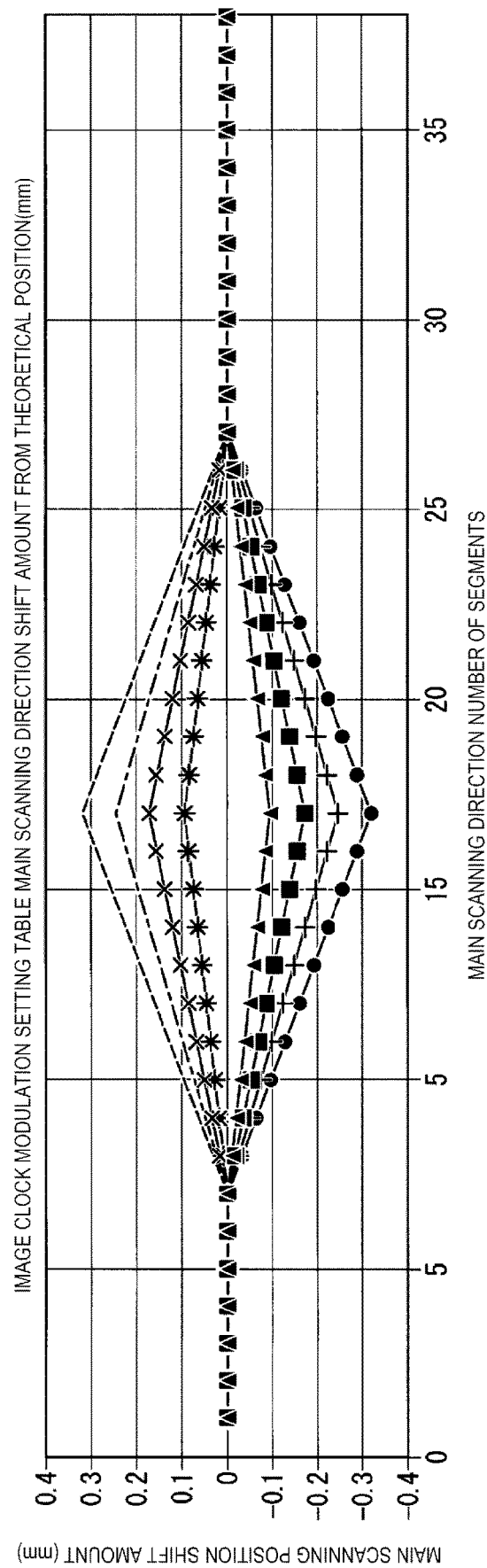
FIG. 15 shows an image clock modulation setting chart for shift amount from theoretical position.
Figure 16:
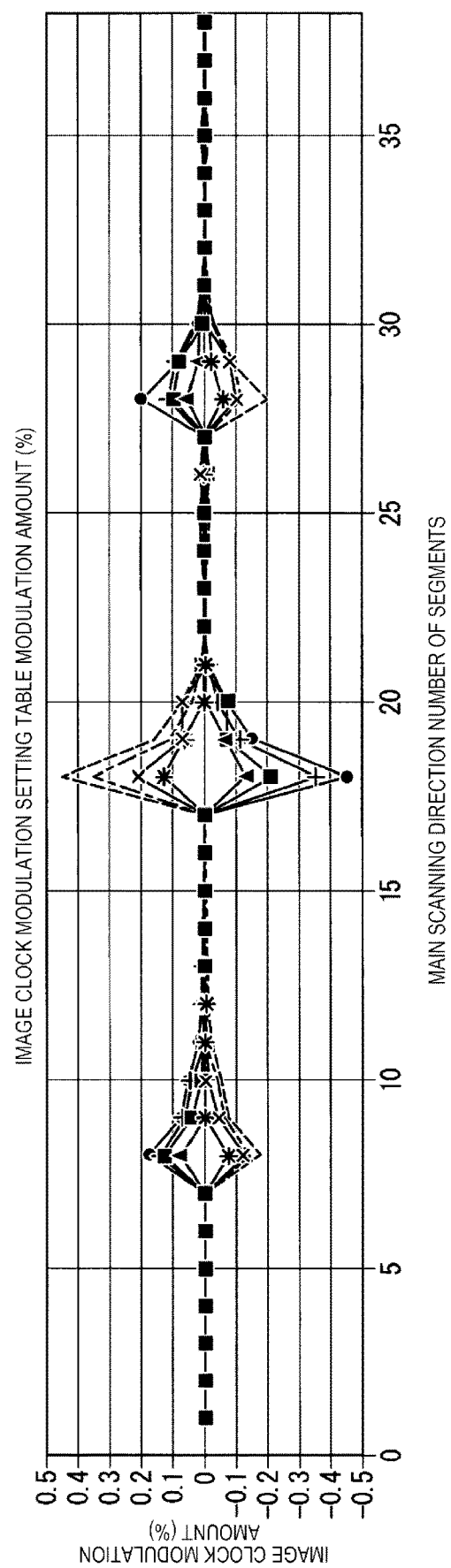
FIG. 16 shows an image clock modulation setting chart for image clock modulation amount.

FIGS. 15 and 16 are views showing examples of an image clock modulation setting table (depicted as a chart in the figures for explanatory convenience). In FIG. 15, the horizontal axis represents the number of segments along the main scanning direction, and the vertical axis represents a shift amount (correction amount) (in millimeters) of the main scanning position. In addition, in FIG. 16, the horizontal axis represents the number of segments along main scanning direction, and the vertical axis represents a change amount (%) of the image clock. The image clock modulation setting table shown in FIG. 15 shows how the main scanning position fluctuates or varies. The image clock modulation setting table shown in FIG. 16 shows a modulation amount of the image clock corresponding to a position change in the image clock modulation setting table shown in FIG. 15. The image clock modulation setting table satisfies the following conditions. For example, the position in the vicinity of the alignment sensor is not changed and, at the other main scanning positions, the image clock is changed so that the shift amount of the position becomes the maximum in the vicinity of the center. Here, "without changing the position in the vicinity of the alignment sensor" means not to adjust/correct the position of the image in the main scanning direction.

The correction unit 308 refers to the image clock modulation setting table shown in FIG. 15 and selects the image clock modulation setting table corresponding to the determined correction amount. Next, the correction unit 308 refers to the image clock modulation setting table shown in FIG. 16 and acquires the value of the modulation amount of the selected image clock modulation setting table. The correction unit 308 corrects the image position for each color by instructing the LD control unit 302 to modulate the LD 401 with the value of the acquired modulation amount.

According to the image forming apparatus 100 configured as described above, it is possible to match the position of the image even if there is no alignment sensor in the vicinity of the center along the main scanning direction of the image. Specifically, the image forming apparatus 100 first reads the correction image (including a plurality of color patches) formed on the correction sheet. Next, the image forming apparatus 100 calculates a center position of each color patch based on the RGB values of the correction image as read/scanned. Next, the image forming apparatus 100 calculates a shift amount based on the center position of the color patches of the reference color and the center position of another color patch. Then, the image forming apparatus 100 determines a correction amount so as to correct the shift in the image position. As a result, it is possible to match the position of the image even if there is no alignment sensor in the vicinity of the center of the image along the main scanning direction. In addition, since the total number of alignment sensors may be reduced, it is possible to reduce costs and constraints on component design.

In addition, according to the image forming apparatus 100, even when a scanner with a low resolution is used, it is still possible to correct the color shift by detecting the shift amount with high accuracy. In addition, the image forming apparatus 100 forms a correction image on a sheet such that a non-reference color patch is interposed between two reference color patches. As a result, it is possible to perform correction in a short time. Therefore, it is possible to perform correction efficiently.

Hereinafter, a modification example of the image forming apparatus 100 will be described. In the modification, the configuration in which the correction sheet is read by the image reading unit 200 is shown, but the reading of the correction sheet is not necessarily limited thereto. For example, the correction sheet may be read by manually feeding the correction sheet.

According to the image forming apparatus 100 of at least one embodiment described above, the apparatus includes a printer unit, an image reading unit, and a processor. The printer unit generates a correction sheet by forming a monochrome correction image to be used for correcting image positions of a plurality of colors on a plurality of different kinds of sheets. The image reading unit reads the correction image formed on the correction sheet. The processor calculates a shift amount for the different colors in the main scanning direction based on the RGB values of the correction image as read to correct image positions for the various colors using a calculated shift amount. As a result, even if three alignment sensors are not provided, if at least two alignment sensors are provided, it is possible to correct the image positions of the different colors. Therefore, it is possible to reduce the costs while suppressing constraints on component design.

Some functions of the image forming apparatus 100 in the above-described embodiments may be realized by a computer. In that case, a program for realizing these functions is recorded on a computer-readable recording medium. Then, the functions may be realized by causing a computer system to read and execute a program recorded on a recording medium in which the above-described program is recorded. The "computer system" referred to here includes hardware, and other components such as an operating system and/or peripheral equipment. In addition, "computer-readable recording medium" refers to a portable medium, a storage device, or the like. The portable medium is a flexible disk, magneto-optical disk, ROM, CD-ROM or the like. In addition, the storage device is a hard disk built in the computer system or the like. Furthermore, the "computer-readable recording medium" may hold a program for a relatively short time such when such a program is transmitted via a network for storage or stored in a volatile memory during execution for a certain period of time. In addition, the "computer-readable recording medium" may be a memory inside a computer system serving as a server or a client.

Further, the above-described program may be realized by combining the above-described functions with a program already recorded in the computer system.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:
   a printer configured to print, on a sheet, a first region of a first color, a second region of a second color, a third region of a third color, and a fourth region of the first color, the second region and the third region being between the first region and the fourth region along a travel direction of the sheet through the printer, the second color and the third color being different from each other;
   an image reader configured to read the sheet to obtain an image of the sheet;
   a first alignment sensor at a position away from a center of the sheet in a main scanning direction of the printer,
   a second alignment sensor at another position away from the center of the sheet in the main scanning direction of the printer; and
   a processor configured to:
      calculate a first shift amount in the main scanning direction of the printer for the second region based on the image,
      calculate a second shift amount in the main scanning direction of the printer for the third region based on the image,
      correct a first printing position for the second color in the main scanning direction based on the first shift amount, and
      correct a second printing position for the third color in the main scanning direction based on the second shift amount, wherein
   the processor varies a clock for an exposure source for the second color to correct the first printing position between the positions of the first and second alignment sensors in the main scanning direction.

2. The image forming apparatus according to claim 1, wherein the printer prints the second region and the third region without printing any region with the first color between the second region and the third region on the sheet.

3. The image forming apparatus according to claim 1, wherein the first color is black.

4. The image forming apparatus according to claim 1, wherein the second color is magenta.

5. The image forming apparatus according to claim 1, wherein the second color is yellow.

6. The image forming apparatus according to claim 1, wherein the third color is cyan.

7. The image forming apparatus according to claim 1, wherein the first color is black, the second color is yellow, and the third color is cyan.

8. The image forming apparatus according to claim 1, wherein the image reader is a document scanner.

9. The image forming apparatus according to claim 1, wherein the printer is a laser printer.

10. A printing apparatus, comprising:
a printer configured to print a test sheet, the test sheet having a first region of a first color, a second region of a second color, a third region of a third color, and a fourth region of the first color, the second region and the third region being between the first region and the fourth region along a travel direction of the test sheet through the printer, the second color and the third color being different from each other;
an image scanner configured to provide an image of the test sheet;
a first alignment sensor at a position away from a center of the test sheet in a main scanning direction of the printer;
a second alignment sensor at another position away from the center of the test sheet in the main scanning direction of the printer; and
a processor configured to:
calculate a first shift amount in the main scanning direction of the printer for the second region based on the scanned image,
calculate a second shift amount in the main scanning direction of the printer for the third region based on the scanned image,
correct a first printing position for the second color in the main scanning direction based on the first shift amount, and
correct a second printing position for the third color in the main scanning direction based on the second shift amount, wherein
the processor varies a clock for an exposure source for the second color to correct the first printing position between the positions of the first and second alignment sensors in the main scanning direction.

11. The printing apparatus according to claim 10, wherein the printer comprises a polygonal mirror configured to scan a light source exposure position along the main scanning direction.

12. The printing apparatus according to claim 10, wherein the printer prints the second region and the third region without printing any region with the first color between the second region and the third region on the sheet.

13. The printing apparatus according to claim 12, wherein the first color is black, the second color is one of yellow, cyan, and magenta, and the third color is not black.

14. A printer apparatus, comprising:
a printer configured to print an image on a test sheet, the image including a first region of a first color, a second region of a second color, a third region of a third color, and a fourth region of the first color, the second region and the third region being between the first region and the fourth region along a travel direction of the test sheet through the printer, the second color and the third color being different from each other;
an image scanner configured scan the image printed on the test sheet;
a first alignment sensor at a position away from a center of the test sheet in a main scanning direction of the printer;
a second alignment sensor at another position away from the center of the test sheet in the main scanning direction of the printer; and
a processor configured to:
calculate a first shift amount in the main scanning direction of the printer for the second region based on the scanned printed image,
calculate a second shift amount in the main scanning direction of the printer for the third region based on the scanned printed image,
correct a first printing position for the second color in the main scanning direction based on the first shift amount, and
correct a second printing position for the third color in the main scanning direction based on the second shift amount, wherein
the processor varies a clock for an exposure source for the second color to correct the first printing position between the positions of the first and second alignment sensors in the main scanning direction.

15. The printer apparatus according to claim 14, wherein the image on test sheet includes no region of the first color interposed between the second region and the third region.

16. The printer apparatus according to claim 15, wherein the first color is black, the second color is one of yellow, cyan, and magenta, and the third color is not black.

17. The printer apparatus according to claim 14, wherein the first color is black, the second color is one of yellow, cyan, and magenta, and the third color is not black.

* * * * *